United States Patent [19]
Gulistan

[11] 3,746,067
[45] July 17, 1973

[54] SHEAR-RESISTANT CAPTIVE SCREW
[75] Inventor: Bulent Gulistan, Malibu, Calif.
[73] Assignee: Deutsch Fastener Corp., Los Angeles, Calif.
[22] Filed: Dec. 15, 1971
[21] Appl. No.: 208,483

Related U.S. Application Data
[60] Continuation of Ser. No. 59,274, July 29, 1970, abandoned, which is a division of Ser. No. 841,325, July 14, 1969, Pat. No. 3,614,799.

[52] U.S. Cl. .................................. 151/69, 29/512
[51] Int. Cl. ...................... F16b 43/00, B21d 39/00
[58] Field of Search ........................ 151/69, 41.74; 10/155 A, 10 R; 29/512, 509, 443; 287/180.36 F; 85/50 R, 1 R, 1 K

[56] References Cited
UNITED STATES PATENTS

| | | | |
|---|---|---|---|
| 1,251,676 | 1/1918 | McCaffray | 85/1 K |
| 2,018,346 | 10/1935 | Busby | 151/69 UX |
| 3,037,542 | 6/1962 | Boyd | 151/21 X |
| 3,058,211 | 10/1962 | Axtell | 29/509 |
| 3,059,736 | 10/1962 | Boyd | 151/69 X |
| 3,389,736 | 6/1968 | Gulistan | 151/69 |
| 3,414,154 | 12/1968 | Rose et al. | 151/69 X |
| 3,415,301 | 12/1968 | Neuschotz | 151/41.76 X |
| 3,418,012 | 12/1968 | La Torre | 85/1 R X |
| 3,502,130 | 3/1970 | Gulistan | 151/69 |
| 3,505,921 | 4/1970 | Wigam | 151/69 X |
| 3,560,132 | 11/1968 | Gulistan | 151/69 |

Primary Examiner—Ramon S. Britts
Attorney—Richard F. Carr

[57] ABSTRACT

A captive screw including a sleeve having a bore substantially complementarily receiving a relatively large diameter portion of the shank of a screw inwardly of the screw head, with an annular enlargement on the shank, of greater diameter than the bore, being located at the end of this shank portion and retaining the screw to the sleeve. Beyond the annular enlargement, the shank is provided with an annular groove and rolled threads on its outer end. The sleeve includes a head at one end and an enlarged bore portion at the opposite end providing a relatively thin wall adapted to be bent outwardly to secure the sleeve to a workpiece.

4 Claims, 10 Drawing Figures

Patented July 17, 1973
3,746,067
2 Sheets-Sheet 1
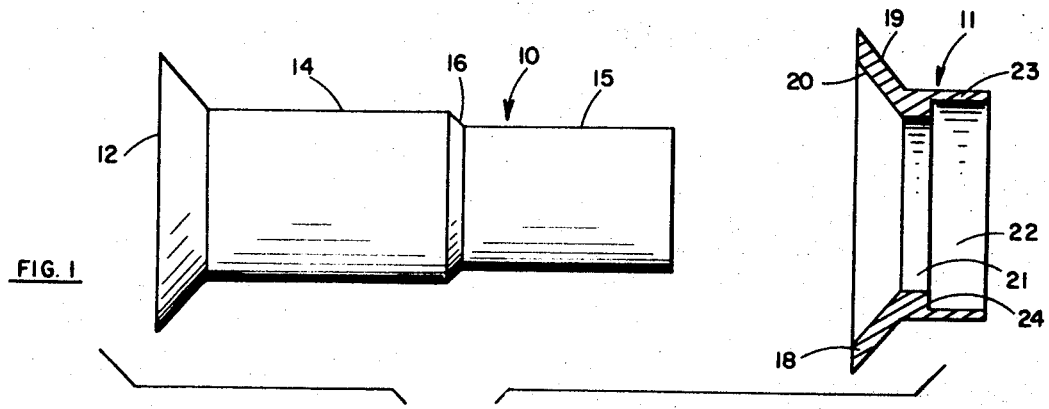
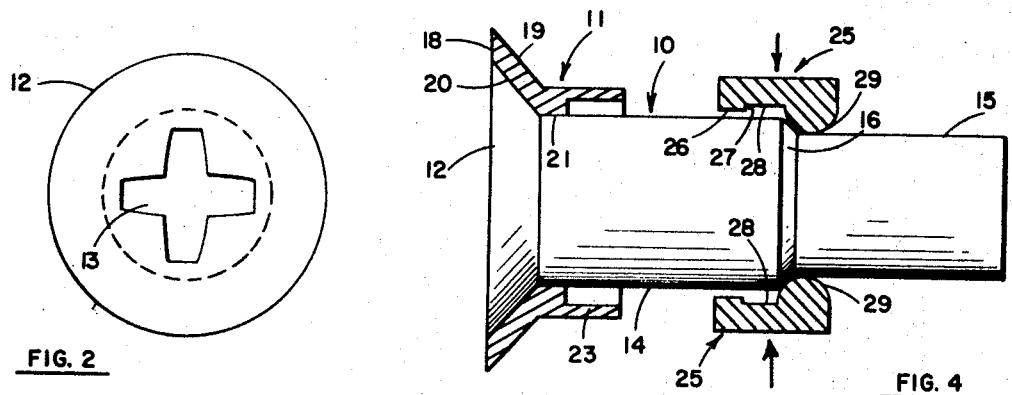
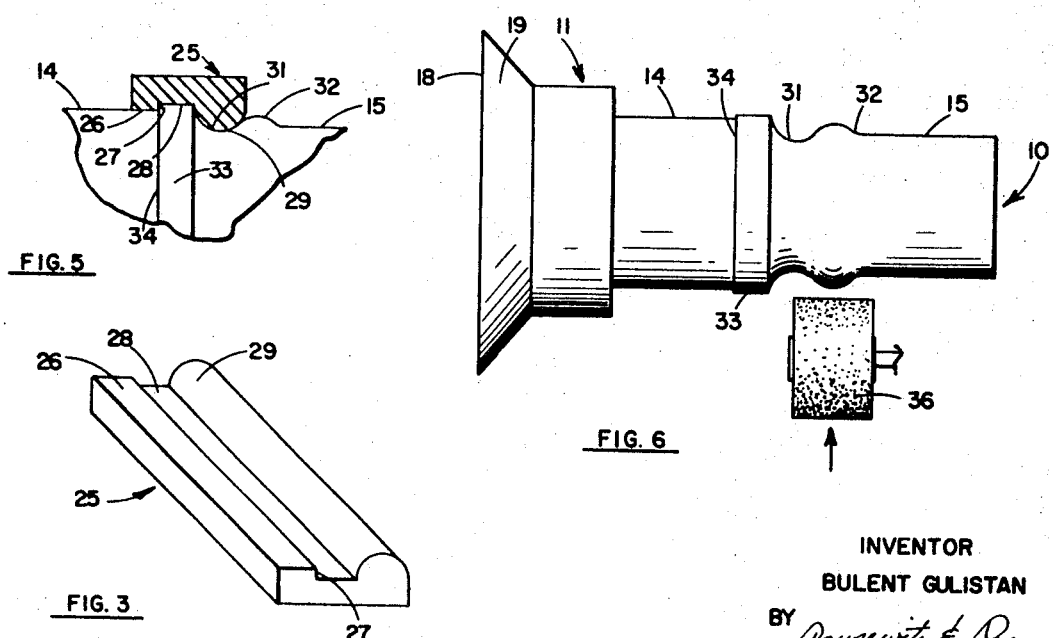
INVENTOR
BULENT GULISTAN
BY
ATTORNEYS

INVENTOR
BULENT GULISTAN

BY
*Gussowitz & Carr*
ATTORNEYS 3,746,067

SHEAR-RESISTANT CAPTIVE SCREW

REFERENCE TO RELATED APPLICATIONS

This is a continuation of my copending application Ser. No. 59,274, filed July 29, 1970, for ShearResistant Captive Screw, now abandoned which is a division of application Ser. No. 841,325, filed July 14, 1969, now U.S. Pat. No. 3,614,799, for Shear-Resistant Captive Screw.

BACKGROUND OF THE INVENTION

1. The Field of the Invention

This invention relates to a captive screw.

2. The Prior Art

Captive screws, which normally include threaded elements retained by sleeves which can be attached to a workpiece, offer significant advantages, which has led to their use in a variety of situations. Typically, captive screws are used for aircraft panels that serve as access doors for maintenance and repair. When captive screws are held to the panel, they are always instantly available for securing the panel in place when it is to be reattached. This saves time and, therefore, expense. Also, in the event that the panel is to be secured by fasteners of different sizes, it assures that the proper screw is at each location. If captive screws are not used, the panel fasteners frequently become lost when the panel is removed. This becomes a significant item when the fasteners must be made of titanium or other costly materials. Additionally, when conventional fasteners of hard material are repeatedly moved through the openings in a panel of softer material, such as aluminum, wear takes place and the openings may become too large. This would be avoided by the use of a captive screw because its sleeve acts as a bearing for the stud that passes through it, so that the moving element does not touch the panel and cannot enlarge the opening in it.

Despite these advantages, however, it has been impossible to use captive screws in many places because of their inability to withstand loads in shear. In producing fasteners with a screw slidable to a sleeve, prior designs have completely sacrificed an ability to carry shear loads.

SUMMARY OF THE INVENTION

The present invention provides an improved captive screw which is capable of withstanding high loads in shear. The fastener includes a sleeve having a bore through which the shank of the screw extends. The shank includes a first portion within the sleeve bore that is substantially complementary to the bore of the sleeve and results in the shear capabilities for the fastener. At the end of this portion of the bore is an annular enlargement providing a shoulder that retains the screw to the sleeve. Beyond the annular enlargement is a groove, outwardly of which on the end portion of the shank are rolled threads.

The portion of the shank that is within the bore of the sleeve is of relatively large diameter for added strength, so that the diameter of this part of the shank is greater than the major diameter of the threads on the end of the shank. Consequently, the annular enlargement is required for retaining the screw to the sleeve.

The sleeve has a head at one end and a second bore portion of larger diameter at the opposite end. The result is a relatively thin wall at the opposite end which can be bent outwardly for cooperating with the head in securing the sleeve to a workpiece.

In producing the captive screw, the screw blank first is formed to provide a head, beyond which is a shank portion of a first diameter connecting through a tapered shoulder to an end portion of smaller diameter. With the sleeve prepared to have a bore substantially complementary to the first portion of the shank, it is fitted over the shank so that the end portion of the first part of the shank projects beyond the sleeve. Then, opposed dies are brought to bear against the shank to produce the annular enlargement. These dies have convex arcuate portions that engage the smaller diameter portion adjacent the tapered shoulder. The dies also have recesses that confine the material displaced outwardly in one direction by the arcuate die portions and define the dimensions of the annular enlargement that is produced. In forcing the material outwardly for the annular enlargement, the convex portions of the dies create an annular groove. They also cause some enlargement of the smaller diameter portion of the shank adjacent the groove, and this part is then removed to provide the outer end of the shank with a uniform dimension and the pitch diameter of the threads that are to be produced. Next is the thread-rolling operation, which completes the fastener. It is attached to a workpiece by fitting the sleeve through an opening in the workpiece, so that the thin-walled end portion projects outwardly beyond the end of the opening. Then, the thin-walled portion is bent outwardly to define a flange which holds the sleeve and, therefore, the screw to the workpiece.

An object of this invention is to provide an arrangement for a captive screw having resistance to shear loads.

Another object of this invention is to provide an arrangement for holding a screw to a sleeve without the use of extra parts which can become dislodged and allow the screw to become separated from the sleeve.

These and other objects will become apparent from the following detailed description taken in connection with the accompanying drawing.

BRIEF DESCRIPTION OF THE DRAWING

FIG. 1 is an exploded side elevational view, partially in section, illustrating the screw blank and sleeve used in producing a captive screw in accordance with this invention;

FIG. 2 is an end elevational view of the head of the screw blank;

FIG. 3 is a perspective view of a die used in producing the annular enlargement to hold the screw to the sleeve;

FIG. 4 is a longitudinal sectional view, partially in elevation, showing the application of the opposed dies in the rolling operation for producing the annular enlargement;

FIG. 5 is a view similar to FIG. 4, with the annular enlargement completed;

FIG. 6 is an elevational view showing the removal of the bulge produced on the smaller diameter portion of the shank as the annular enlargement is produced;

DESCRIPTION OF THE PREFERRED EMBODIMENT

Figure 7:
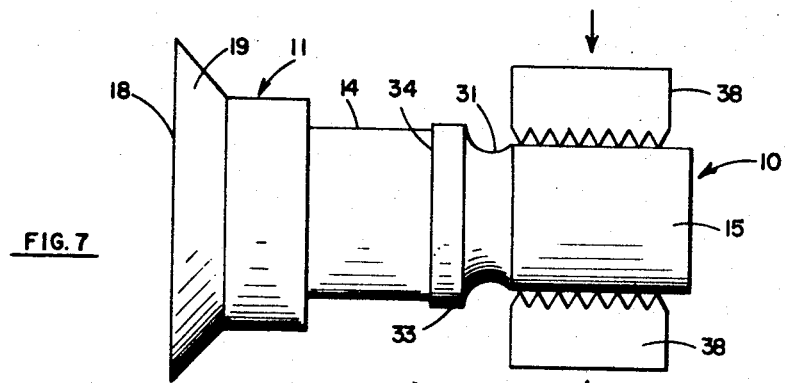
FIG. 7 is an elevational view showing the rolling of the threads on the end portion of the shank.

In obtaining the captive screw of this invention, there are first prepared a screw blank 10 and a sleeve 11, as seen in FIGS. 1 and 2. The screw blank 10 may be produced by cold heading, following which it is heat treated and then preferably ground to relatively close tolerances. The blank 10 includes a head 12 provided with a suitable driving recess 13. In the embodiment illustrated, the head 12 is of frustoconical configuration to provide a flush head installation. Extending outwardly from the head 12 is a shank that includes a first portion 14 adjacent the head which is of larger diameter than the outer portion 15 at the distal end of the shank. The latter part of the shank is made to a diameter corresponding to the pitch diameter of the threads which later are to be formed on it. A shoulder 16, tapered toward the outer end of the shank, connects the larger portion 14 of the shank to the outer portion 15 of smaller diameter.

The sleeve 11 includes a head portion 18 having a frustoconical undersurface 19 in order that it can fit within a complementary recess in a part to which the sleeve later is attached. The head 18 also includes a frustoconical inner surface 20, which is complementary to the undersurface of the head 12 of the blank 10. The sleeve 11 includes a first bore 21 adjacent the head 18, which is dimensioned to make a sliding, close-tolerance fit with the larger shank portion 14 of the blank 10. Beyond the bore 21 is a larger end bore 22 which provides the sleeve with an end portion 23 having a relatively thin wall and a shoulder 24 between the two bores. The sleeve is made shorter than the length of the shank portion 14 of larger diameter.

The blank 10 then is inserted into the sleeve 11, as shown in FIG. 3, so that the larger portion 14 of the shank fits within the opening 21 of the sleeve. Also, the head 12 of the blank 10 is brought into adjacency with the surface 20 of the head 18 of the sleeve. In this relative position of the blank 10 and sleeve 11, the outer part of the blank portion 14 projects beyond the end of the sleeve.

With the sleeve 11 on the blank 10 in this manner, the shank is then engaged by opposed dies 25, being rolled between them to receive the contour of the dies. This step is similar to a thread-rolling operation. The dies 25, as seen in FIG. 3, are elongated members, each of which includes a first flat surface 26 along one side. This flat surface connects, through a shoulder 27 at right angles to it, with a second flat surface 28. The flat surface 28 is parallel to the surface 27 and recessed beneath it. Beyond the surface 28, at the opposite side of the die 25, is a projecting portion 29 which has an arcuate outer contour defined by a cylindrical segment.

The dies are forced inwardly against the blank 10 at a position where the junctions between the flat surfaces 28 and the arcuate portions 29 of the dies are adjacent the end of the larger diameter portion 14 of the shank. Therefore, when the dies are pressed inwardly, the arcuate portions 29 engage the inner part of the smaller diameter end portion 15 of the shank. The arcuate portions 29, therefore, displace the material of the shank, giving it the contour shown in FIGS. 5 and 6. This produces a groove 31 in the inner part of the end portion 15 of the shank.

Some of the material displaced when the groove 31 is produced results in a bulged portion 32, outwardly of the groove, where the diameter of the shank portion 15 is increased locally. Additional portions of the material of the blank are forced outwardly in the other direction into the recesses in the dies. This material is confined and shaped by the inner flat surfaces 28 of the dies, as well as the die shoulders 27. The result is an outwardly projecting annular portion 33 at the end of the shank portion 14, which is of predetermined size as established by the contours of the dies 25. Thus, the height, width and shape of the annular segment 33 are controlled by the configuration and dimensions of the die surfaces 27 and 28, and the portion 33 is given a cylindrical circumferential surface.

The annular part 33 thus produced connects to the remainder of the shank portion 14 by a generally radial shoulder 34, and it is of greater outside diameter than the diameter of the bore portion 21 of the sleeve 11. Consequently, this permanently retains the sleeve 11 on the blank 10, as the shank no longer can be pulled through the sleeve 11. The shoulder 34 of the blank 10 will engage the shoulder 24 between the bore sections 21 and 22 to prevent such movement. The blank 10 may move a limited distance axially relative to the sleeve 11 as determined by the length of the sleeve bore 21 and the spacing between the shoulder 34 and the head 12 of the blank.

Figure 8:
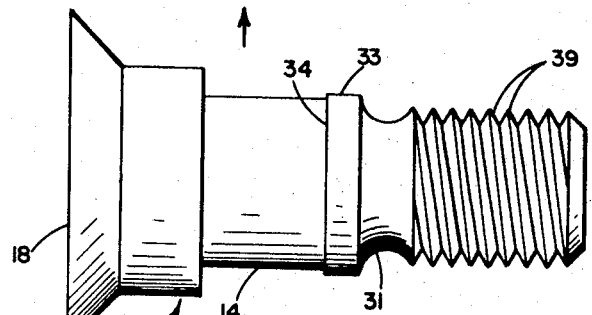
FIG. 8 is a longitudinal sectional view, partially in elevation, of the completed captive screw.

After the blank 10 has been shaped in this manner by the dies 25, the bulge 32 is removed. This may be accomplished suitably by a grinding wheel 36, which brings the entire portion of the shank 15 beyond the groove 31 to a constant exterior diameter that corresponds to the pitch diameter of the threads to be formed (see FIG. 8).

After this, the shank portion 15 is engaged between a pair of conventional thread-rolling dies 38, as shown in FIG. 7, producing threads 39 on the end of the shank. This provides the completed fastener ready to be attached to a workpiece.

Figure 9:
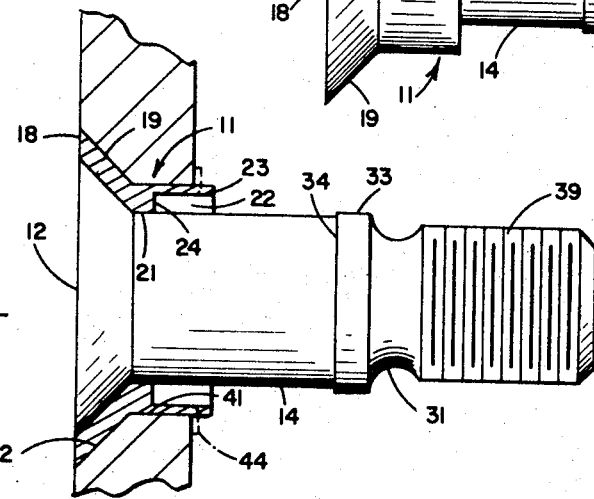
FIG. 9 is a longitudinal sectional view, partially in elevation, showing the attachment of the captive screw to a workpiece.

The resulting captive screw then is secured to a workpiece, such as the panel 40 shown in FIG. 9. The panel 40 is provided with an opening 41 dimensioned to receive the cylindrical outer portion of the sleeve 11, having a countersink 42 at one end for engagement by the undersurface 19 of the head 18 of the sleeve. The panel 40 and sleeve 11 are proportioned so that the thin-walled end portion 23 of the sleeve then projects beyond the panel surface 43 at the end of the opening 41 opposite the countersink 42. The outer part of the thin-walled portion 23 then is bent over the surface 43 of the panel 40, as indicated in phantom in FIG. 9, producing a flange 44 at the outer end of the sleeve 11. This flange 44 cooperates with the head 18 in attaching the sleeve 11 to the panel 40. This, in turn, secures the screw to the panel 40, with freedom for limited axial movement relative to the panel.

Figure 10:
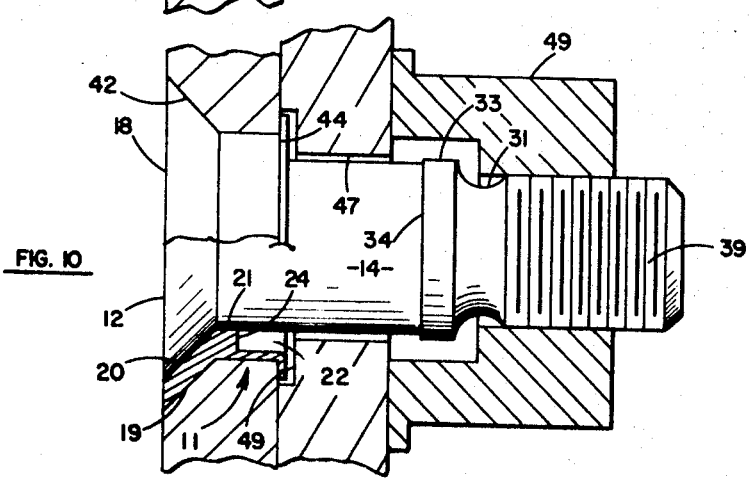
FIG. 10 is a longitudinal sectional view, partially in elevation, showing the workpiece to which the screw is attached secured by the screw to a second workpiece.

The captive screw then may be used in securing the panel 40 to another part, as indicated in FIG. 10. Here, the panel 40 is shown connected to a member 46 having a bore 47 through which the shank of the screw extends. The bore 47 includes a recessed portion 48 at one end providing clearance for the flange 44. The shank extends beyond the opening 47 to enter a conventional counterbored nut plate 49 which the threads 39 engage. Therefore, the screw, through the nut plate 49 and the sleeve 11, secures the panel 40 to the member 46.

The resulting connection will withstand high loads in shear. This is because there is a relatively large diameter portion of the shank of the screw that extends substantially complementarily through the smaller bore portion 21 of the sleeve 11. This provides the shank of the screw with added material and an ability to withstand loads in shear which can be transmitted through the sleeve 11 to the closely fitting shank. Unlike conventional captive screws, therefore, the arrangement of this invention provides substantial shear strength and can be used for structural applications.

The foregoing detailed description is to be clearly understood as given by way of illustration and example only, the spirit and scope of this invention being limited solely by the appended claims.

I claim:

1. A fastener comprising
a one-piece screw,
said screw having a head at one end and a shank projecting from said head,
said shank having
a portion of a first diameter adjacent said head,
an integral annular enlargement of a greater diameter than said first diameter spaced outwardly from said head and positioned at the end of said portion of a first diameter,
said integral annular enlargement having a cylindrical outer surface, and defining a substantially radial shoulder, said head connecting to said portion of a first diameter,
an annular groove,
said annular groove being arcuate and concave in cross section, one end of said annular groove extending to said annular enlargement,
and a distal end portion extending outwardly from the opposite end of said groove,
said distal end portion having external threads thereon, said external threads having a major diameter which is no greater than said first diameter,
and a sleeve,
said sleeve having a head at one end, said sleeve having a cylindrical exterior surface of constant diameter extending from said head to the opposite end of said sleeve, said sleeve including
a first bore portion receiving said portion of said shank of a first diameter,
said first bore portion being of smaller diameter than the diameter of said cylindrical outer surface of said annular enlargement and of said head of said screw, and being shorter than said portion of said shank of a first diameter,
whereby said shank is retained by said sleeve with freedom for limited axial movement relative thereto,
and a second bore portion,
said second bore portion being of relatively large diameter and extending inwardly from the opposite end of said sleeve so as to provide said sleeve with a relatively thin wall bendable outwardly for forming a flange for cooperating with said head of said sleeve in holding said sleeve to a workpiece, said second bore portion being of greater diameter than said diameter of said cylindrical outer surface of said annular enlargement.

2. A fastener comprising
a one-piece screw,
said screw having a head at one end and a shank projecting from said head,
said head having a substantially radial outer surface and a frustoconical undersurface, said shank having
a portion of a first diameter adjacent said head,
an integral annular enlargement of a greater diameter than said first diameter spaced outwardly from said head and positioned at the end of said portion of a first diameter, an annular groove,
said annular groove being arcuate and concave in cross section, one end of said annular groove extending to said annular enlargement,
and a distal end portion extending outwardly from the opposite end of said groove,
said distal end portion having external threads thereon, said external threads having a major diameter which is no greater than said first diameter,
and a sleeve,
said sleeve having a head at one end,
said head having a frustoconical undersurface,
said sleeve having a cylindrical exterior surface of constant diameter extending from said head to the opposite end of said sleeve, said sleeve including
a first bore portion extending inwardly from said one end thereof,
said first bore portion being frustoconical and adapted to complementarily engage said undersurface of said head of said screw,
an intermediate bore portion receiving said portion of said shank of a first diameter,
said intermediate bore portion being of smaller diameter than the diameter of said annular enlargement and of said head of said screw, and being shorter than said portion of said shank of a first diameter,
whereby said shank is retained by said sleeve with freedom for limited axial movement relative thereto,
and a third bore portion,
said third bore portion being of relatively large diameter and extending inwardly from the opposite end of said sleeve so as to provide said sleeve with a relatively thin wall bendable outwardly for forming a flange for cooperating with said undersurface of said head of said sleeve in holding said sleeve to a workpiece, said third bore portion being of greater diameter than said annular enlargement.

3. A device as recited in claim 2 in which said intermediate bore portion is relatively short, being shorter than said first and third bore portions.

4. A device as recited in claim 3 in which said annular enlargement provides a substantially radial shoulder adjacent said head of said screw, and a cylindrical outer surface, the diameter of said cylindrical outer surface being less than said diameter of said third bore portion.

* * * * *